US007007030B2

(12) United States Patent
Zibin et al.

(10) Patent No.: US 7,007,030 B2
(45) Date of Patent: Feb. 28, 2006

(54) METHOD OF ENCODING A DATASET

(75) Inventors: Yoav Zibin, Haifa (IL); Joseph Gil, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 552 days.

(21) Appl. No.: 10/146,141

(22) Filed: May 16, 2002

(65) Prior Publication Data
US 2003/0078935 A1 Apr. 24, 2003

Related U.S. Application Data

(60) Provisional application No. 60/290,957, filed on May 16, 2001.

(51) Int. Cl.
*G06F 17/00* (2006.01)
(52) U.S. Cl. .............................. 707/100; 707/1; 707/10
(58) Field of Classification Search ................ 707/100, 707/101, 102, 4, 10, 1
See application file for complete search history.

(56) References Cited

U.S. PATENT DOCUMENTS

| 5,488,727 A | * | 1/1996 | Agrawal et al. ............ 717/154 |
| 5,696,973 A | * | 12/1997 | Agrawal et al. ............ 717/154 |
| 5,696,974 A | * | 12/1997 | Agrawal et al. ............ 717/152 |
| 6,728,728 B1 | * | 4/2004 | Spiegler et al. ......... 707/103 R |
| 2002/0055929 A1 | * | 5/2002 | Kolodner et al. ....... 707/103 R |

OTHER PUBLICATIONS

Gopal, Rajeev "Dynamic program slicing based on dependence relations", Conference on Software Maintenance, 1991, 15-17, p. 191-200.*

Kellogg S. Booth and George Lueker, Testing for the Consecutive Ones Property, Interval Graphs, and Graph Planarity Using PQ-Tree Algorithms, Journal of Computer and System Sciences 13, 335-379(1976).*
Bogdan Korel and Jrgen Rilling, Dynamic Program Slicing in Understanding of Program Execution, Department of Computer Science Illinois Institute of Technology, 1997, IEEE.*
N. H. Cohen, Type-Extension Tests Can Be Performed in Constant Time, ACM Transactions on Programming Languages and Systems, vol. 13, No. 4, Oct. 1991, pp. 625-629.
J. Vitek, R. N. Horspool and A. Krall, Efficient Type Inclusion Tests, Proc. of the Object-Oriented Programming Languages, Systems and Applications, OOPSLA '97, Atlanta, Oct. 1997, pp. 1-16.
R. Agrawal, A. Borgida and H. V. Jagadish, Efficient Management of Transitive Relationships in Large Data and Knowledge Bases, pp. 253-262.

* cited by examiner

Primary Examiner—Greta Robinson
Assistant Examiner—Susan Rayyan

(57) ABSTRACT

A method of representing a dataset having a plurality of elements characterized by a plurality of relations, the method comprising the following steps. A first step includes, slicing at least a portion of the dataset into a plurality of slices, each of the slices comprises a portion of the plurality of elements. A second step includes, for each element of the plurality of elements, assigning a set of identifiers, each identifier of the set being characterized by a position within the set, the position representing one of the slices. A third step includes, for each element of the plurality of elements, assigning an interval, the interval representing at least one relation of the element to at least one element of the plurality of elements.

95 Claims, 14 Drawing Sheets

METHOD OF ENCODING A DATASET

RELATIONSHIP TO EXISTING APPLICATIONS

The present application claim priority from U.S. Provisional Patent Application No. 60/290,957, filed May 16, 2001.

FIELD AND BACKGROUND OF THE INVENTION

The present invention relates to a subtype test and, more particularly, to a method of encoding a dataset based on an inheritance hierarchy of the dataset.

Most modern programming languages are based on the notion of type conformance, which allows polymorphism and code reuse. Type conformance is often facilitated by a dedicated procedure to decide whether two types are related by a given subtyping relationship. This procedure is known as a subtype test or a type inclusion tests. Broadly speaking, a specific computer language may distinguish between a type, a class, an interface, a signatures, etc. However, subtype tests are employed onto any set of objects which may be ordered on some graph.

An efficient implementation of the type inclusion test plays an important role in the performance of object-oriented (OO) programming languages with multiple subtyping, such as C++ (e.g., the "dynamic_cast" operation), Eiffel (the "?=" operation), Java ("instanceof"), Smalltalk ("is-KindOf"), and the like.

A subtype test is one of the basic operations in a run time environment of object-oriented programs. A formal definition of a subtype test is as follows: given an object, o, and a type b, a subtype test is a query whether the type, a, of the object, o, is a subtype of b, i.e., whether a is a descendant of b in an inheritance hierarchy.

A subtype relation which is reflexive, transitive and anti-symmetric is typically denoted by the subtype symbol, "≺". The subtype symbol is used to denote a relation between two types, say, type a and type b. Hence, if it is found that a≺b then it is said that a is a subtype of b and b is a supertype of a. More generally, given a hierarchy of the form of a set T of types and subtype relations, it is desired to construct a data structure supporting subtype relation queries. Once such a data structure is generated it is said that the hierarchy has been encoded. This encoding involves computer operations which may be both time and space consuming, and hence affect the performances of a specific computer application.

Each encoding procedure may be characterized by four complexity measures.

A first measure is a space measure, also called the encoding length. Encoding methods associate certain data with each type. The space measure is the average number of bits per type.

A second measure is an instruction count measure, which is the number of machine instructions in the test code, on certain hardware architecture. There are indications that the space consumed by the test code, which can appear many times in a program, can dominate the encoding length. An encoding is said to be uniform if there exists an implementation of the test code in which the instruction count does not depend on the size of the hierarchy.

A third measure is a test time measure, which reflects on the complexity of the test code. Time complexity is of major interest in the art. Since the test code might contain loops, the time complexity may not be constant even in uniform encodings, however, constant time encodings are always uniform. To improve timing performance, loops of non-constant time encodings may be unrolled, giving rise to non-constant instruction count, without violating the uniformity condition.

Typically, at compilation time, the supertype b, is known. The test code can then be specialized, by precomputing values depending on b only, and emitting them as part of the test code. Specialization thus benefits both instruction count and test time, and may even reduce the encoding length.

A fourth measure is an encoding creation time which is the elapsed time for generating the actual encoding. This task is typically computationally difficult, so different creation algorithms have been proposed for the same encoding scheme. These algorithms differ in their running time and encoding length.

Many subtyping methods are known in the art. The most obvious method is called binary matrix (BM) representation, in which although the time measure is constant, the encoding length is extremely large (of the order of the size of the set T). Hence, the BM method is useful for small hierarchies and is used, e.g., for encoding a JAVA interface hierarchy in the CACAO 64-bit JIT compiler. However, for large hierarchies containing 5500 types the total size of the binary matrix is rather large and may typically reach 3.8 MB.

The observation that stands behind the work on subtyping tests is that the BM representation is in practice very sparse, and therefore susceptible to massive optimization. Nevertheless, the number of partially ordered sets having n elements is $2^{\prec(n^2)}$, so the representation of some partially ordered sets requires $\Omega(n^2)$ bits. Thus, for arbitrary hierarchies the performance of binary matrix is asymptotically optimal.

Another method is called a directed acyclic graph (DAG) encoding, according to which a directed acyclic graph is constructed. On the graph, nodes represent types and edges represent direct subtype relations, denoted $\prec_d$. Two types belong to a direct subtype relation if and only if (iff) there is no third type which is simultaneously a subtype of one and a supertype of the other. Formally, $a\prec_d b$ iff a≺b and there is no c∈T such that a≺c≺b, where a≠b≠c.

The involvement of subtyping problems crucially depends on the inheritance which is characterized by the rules of the computer programming language. A special, relatively simple, case of subtyping problems is the so called "single-inheritance" (SI), in which the hierarchy DAG takes is a tree or forest topology, as mandated by the rules of languages such as Smalltalk or Objective-C. SI cases are discussed hereinafter. A more difficult case is the so called "multiple-inheritance" (MI) hierarchy, which is described first.

Referring now to the drawings, FIG. 1 depicts a DAG topology representation of an MI hierarchy, of types A, B, . . . , I. In FIG. 1, the edges are directed from a subtype to a supertype, and types drawn higher in the diagram are considered larger in the subtype relationship, e.g., $G\prec_d C$ and H≺A.

In DAG-encoding, a list of parents is stored with each type, resulting in total space of $(n+|\prec_d|)\lceil \log n \rceil$ bits where a logarithm is to be understood as a base 2 logarithm. Therefore, the encoding length is $(1+|\prec_d|/n)\lceil \log n \rceil$. In the standard benchmark hierarchies the average number of parents, $|\prec_d|/n$, is less then 2, hence the DAG-encoding enjoys a small encoding length. However, the time measure of DAG-encoding is extremely large, of the order of the size of the set T.

An additional encoding method is Closure-encoding, in which each type stores a sorted array of all of its ancestors. This method improves both the time measure and the space measure, to be O(log n), and (|≺|/n)⌈log n⌉, respectively. Yet, these measures, although improved, are far from being optimal.

The relative numbering method, also known as Schubert's numbering method, guarantees both an optimal encoding length of ⌈log n⌉ bits and constant time subtyping tests. Reference is now made to FIG. 2, which depicts a tree hierarchy of types A, B, . . . , I, and the encoding of each type according to the Relative numbering method. Hence, each type a is encoded by an interval of integers which represent its minimal and maximal ordinals in a postorder traversal of the set T. Although relative numbering is characterized by a low encoding length and constant time, these achievements are only possible in a single-inheritance (SI) hierarchy.

Another algorithm designed for SI hierarchies is known as Cohen's algorithm ([N. H. Cohen, "Type-extension tests can be performed in constant time", *ACM Transactions on Programming Languages and Systems,* 13: 626–629 (1991), the contents of which are hereby incorporated by reference]. The algorithm, relies on hierarchies being relatively shallow, and more so, on types having a small number of ancestors. According to Cohen's algorithm a type a is allocated with an array $r_a$, with entries for each of the supertypes, b, of a. Thus, checking whether or not b≻a can be carried out by checking whether b is indeed present in a predetermined location of the array $r_a$. The encoding is optimized by not storing b itself in this location, but rather an id, which is unique among all types in its level. A level of a type, c, is the length of the longest directed path starting from c. Cohen's encoding stores, with each type a, its level, its unique id within this level, and the array $r_a$.

Reference is now made to FIG. 3, showing a tree hierarchy similar to the hierarchy of FIG. 2, together with an encoding according to Cohen's method. In FIG. 3, each id is shown as a number in a circle, each array is shown as a column of boxes and each level is shown as a number beside the corresponding column.

Also of prior art interest are Packed Encoding (PE) and Bit-Packed Encoding (BPE) [A. Krall, J. Vitek and R. N. Horspool, Efficient Type Inclusion Tests", *Proceedings of the 12th Annual Conference on Object-Oriented Programming Systems, Languages and Applications,* 142–157 (1997), the contents of which are hereby incorporated by reference]. The PE and BPE algorithms are a generalization of Cohen's algorithm for MI hierarchy, both of which enjoy constant time measures. A common theme to PE and BPE is the so called slicing, in which the set T is partitioned into disjoint slices (also called buckets) $S_1, \ldots, S_k$. For each slice $S_i$ the algorithm stores the entire information required to answer queries of whether type a is a subtype of b where a∈T and b∈$S_i$. The essence of the two algorithms is that, a set of descendants of each element in $S_i$ is stored, in a very compressed format, which is possible since there is a great deal of sharing in the descendants set of different members of $S_1$.

The slices of PE and BPE play a role similar to that of levels in Cohen's algorithm. PE associates with each type a a unique integer $id_a$ within its slice $s_a$, so that a is identified by a pair ($s_a$,$id_a$). Also associated with type a is a byte array $r_a$, whose bth position corresponds to $id_b$.

Reference is now made to FIG. 4, which shows a hierarchy of types A, B, . . . , I, which is similar to the hierarchy of FIG. 1, but also includes encodings of each type according to the PE representation. The types of the hierarchy are partitioned into five different slices: $S_1$={A}, $S_2$={B}, $S_3$={D}, $S_4$={C,E} and $S_5$={F, G, H, I}. This is the smallest possible number of slices, since for example type F has five ancestors. PE constrains each slice to a maximum of 255 types, so that $id_a$ can always be represented by a single byte. The encoding length is then 8k, where k is the number of slices. The difference between BPE and PE is that BPE permits two slices or more to be represented within a single byte. Referring again to FIG. 4, slices $S_1$, $S_2$ and $S_3$, are represented using a single bit, slice $S_4$ is represented using two bits and slice S5 is represented using three bits, for a total of seven bits, which can fit into a single byte. While both the BPE and the PE techniques are known to be quite efficient in terms of the time measure, the encoding length of these techniques is relatively high.

Reference is now made to FIG. 5, which illustrates one of the most explored directions in the prior art, known as Bit-vector encoding. In this scheme, each type a is encoded as a vector $vec_a$ of k bits. If an ith element of the vector equals unity then it is said that that type a has gene i. Let φ(a) be a set having all the genes of a, as elements. Then, relation a≺b holds if and only if φ(a) ⊃ φ(a), which can be easily checked by masking $vec_a$ against $vec_b$. FIG. 5 shows an example of bit-vector encoding of the hierarchy of FIG. 1.

In Bit-vector encoding, it is always possible to embed tie hierarchy in a lattice of subsets of {1, . . . k}, by setting k=n and in letting $vec_a$ be a row of the BM which corresponds to a. A simple counting argument shows that k must depend on the size of the hierarchy. Hence, bit-vector encoding is non-constant time, but it is uniform.

Reference is now made to FIG. 6, which illustrates yet another encoding technique, known as Range-Compression Encoding [R. Agrawal, A. Borgida and H. V. Jagadish, "Efficient Management of Transitive Relationships in Large Data and Knowledge Bases", *Proceedings of the* 1989 *ACM SIGMOD International Conference on Management of Data,* 253–262 (1989), the contents of which are hereby incorporated by reference]. This method, which generalizes the Relative Numbering method, has a constant encoding length, and an "almost constant" time. Range Compression encodes each type b as an integer $id_b$, with its ordinal in a postorder scan of a certain spanning forest of the hierarchy. The id's of all the descendants of b form a set φ(b) which includes all the id's of the descendants of b, and can be represented by an array of consecutive disjoint intervals, enumerated by integers from 1 to k(b). For example, in FIG. 6 φ(B)={1, 2, 3, 5, 6, 7, 8, 9} can be represented as two intervals [1, 3] and [5, 9], thus k(B)=2.

Implementation of range compression requires a time measure of the order of O(k(b)). If k(b) is large then a binary search on the intervals of φ(b) reduces the time measure to O(log k(b)). However, the instruction count of the method is Ω(k(b)), which is rather large.

The present invention provides solutions to the problems associated with prior art hierarchy encoding techniques.

SUMMARY OF THE INVENTION

According to one aspect of the present invention there is provided a method of representing a dataset having a plurality of elements characterized by a plurality of relations, the method comprising: for each element of the plurality of elements assigning an identifier and an interval, the interval representing at least one relation of the element to at least one element of the plurality of elements.

According to another aspect of the present invention there is provided an apparatus for representing a dataset having a plurality of elements characterized by a plurality of relations, the apparatus comprising: a first assigning unit for assigning, for each element of the plurality of elements, an identifier; and a second assigning unit for assigning, for each element of the plurality of elements, an interval representing at least one relation of the element to at least one element of the plurality of elements.

According to yet another aspect of the present invention there is provided a method of representing a dataset having a plurality of elements characterized by a plurality relations, the method comprising: slicing at least a portion of the dataset into a plurality of slices, each of the slices comprises a portion of the plurality of elements; for each element of the plurality of elements, assigning a set of identifiers, each identifier of the set being characterized by a position within the set, the position representing one of the slices; and for each element of the plurality of elements, assigning an interval, the interval representing at least one relation of the element to at least one element of the plurality of elements.

According to still another aspect of the present invention there is provided an apparatus for representing a dataset having a plurality of elements characterized by a plurality of relations, the apparatus comprising: a slicer for slicing at least a portion of the dataset into a plurality of slices, each of the slices comprises a portion of the plurality of elements; a first assigning unit for assigning, for each element, a set having a plurality of identifiers, each identifier of the set being characterized by a position within the set, the position representing one of the slices; and a second assigning unit for assigning, for each element, an interval, the interval representing relations of the element to at least one element of the dataset.

According to an additional aspect of the present invention there is provided a method of determining a relation between a first element and a second element of a plurality of elements present in a dataset, each element of the plurality of elements being represented by an identifier and an interval, the interval representing relations of a respective element to at least one element of the plurality of elements, the method comprising: for the first element, determining a value of an interval, thereby obtaining an interval-value; for the second element, determining a value of an identifier, thereby obtaining an identifier-value; and determining whether the identifier-value is within the interval-value, and if so then determining that the second element is a subtype of the first element.

According to yet an additional aspect of the present invention there is provided a method of determining a relation between a first element and a second element of a plurality of elements, the plurality of elements are present in a dataset characterized by a plurality of slices, each slice having a portion of the plurality of elements, each element being represented by a set of identifiers and an interval, wherein the interval represents relations of the element to at least one element of the plurality of elements, and further wherein each identifier of the set is characterized by a position within the set, the position representing one of the slices, the method comprising: for the first element, determining a value of a slice and a value of an interval, thereby obtaining a slice-value and an interval-value; for the second element, determining a value of one identifier having a position which corresponds to the slice-value, thereby obtaining an identifier-value; and determining whether the identifier-value is within the interval-value, and if so then determining that the second element is a subtype of the first element.

According to still an additional aspect of the present invention there is provided a data structure, comprising a plurality of elements, each element being represented by an identifier and an interval, wherein the interval represents relations of a respective element to at least one element of the plurality of elements.

According to a further aspect of the present invention there is provided a data structure, comprising a plurality of slices each slice having a plurality of elements, each element being represented by a set of identifiers and an interval, wherein: the interval represents relations of a respective element to at least one element of the plurality of elements; each identifier of the set of identifiers is characterized by a position within the set, the position representing one of the slices.

According to further features in preferred embodiments of the invention described below, the dataset is a single-inheritance hierarchy dataset.

According to still further features in the described preferred embodiments the dataset is a multiple-inheritance hierarchy dataset.

According to still further features in the described preferred embodiments the elements are computer language elements.

According to still further features in the described preferred embodiments the computer language elements are selected from the group consisting of types, classes, interfaces and signatures.

According to still further features in the described preferred embodiments the relations are selected from the group consisting of subtype relations, and supertype relations.

According to still further features in the described preferred embodiments each of the identifiers is a number having an integer value.

According to still further features in the described preferred embodiments the interval of the element is defined by at least two identifiers of at least two respective elements.

According to still further features in the described preferred embodiments the element and the at least two respective elements, form a portion of one of the slices.

According to still further features in the described preferred embodiments the relations are selected from the group consisting of subtype relations, and supertype relations.

According to still further features in the described preferred embodiments each of the at least two respective elements has a subtype relation to the element, hence each of the at least two respective elements is a descendant of the element.

According to still further features in the described preferred embodiments at least one descendant is a far-most descendant, within one of the slices.

According to still further features in the described preferred embodiments each of the plurality of slices has a maximal size.

According to still further features in the described preferred embodiments the slicing is done so as to provide a minimal number of slices.

According to still further features in the described preferred embodiments the slicing comprises steps of: for each slice: (i) selecting an initial element for the slice; (ii) selecting an additional element and determining whether the additional element is to be included within the slice, and if so than including the additional element within the slice; and (iii) repeating the step (ii) at least once.

According to still further features in the described preferred embodiments the determining whether the additional element is to be included within the slice, is by a depth-first-search traversal on a PQ-tree.

According to still further features in the described preferred embodiments the method further comprising minimizing a total number of identifiers for at least one slice of the slices.

According to still further features in the described preferred embodiments the minimizing is by partitioning the at least one slice so as to provide a plurality of segments, and setting all identifiers within each of the segments to be equal.

According to still further features in the described preferred embodiments the partitioning is by determining overlaps between respective intervals of at least two of the elements.

According to still further features in the described preferred embodiments the method further comprising determining a core for the dataset prior to the step of slicing, the core is a multiple-inheritance hierarchy core.

According to still further features in the described preferred embodiments the portion of the dataset comprises the core.

According to still further features in the described preferred embodiments the method further comprising representing at least a portion of the plurality of slices using a binary matrix.

According to still further features in the described preferred embodiments the method further comprising defining an array having a plurality of cells, each cell comprises one interval and one set of identifiers, wherein a position of each cell corresponds to one element of the plurality of elements.

According to still further features in the described preferred embodiments the method further comprising, for each cell, eliminating a first identifier from a respective set of identifiers.

According to still further features in the described preferred embodiments the slicer is operable to provide a minimal number of slices.

According to still further features in the described preferred embodiments the slicer comprises: (i) an initiator for selecting an initial element for one of the slices; (ii) a selector for selecting an additional element; (iii) a determinator for determining whether the additional element is to be included within one of the slices; and (iv) a memory for storing the additional element.

According to still further features in the described preferred embodiments the determinator comprises means for performing a depth-first-search traversal on a PQ-tree.

The present invention successfully addresses the shortcomings of the presently known configurations by providing a method and apparatus for a method and apparatus for representing a dataset, far exceeding prior art.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
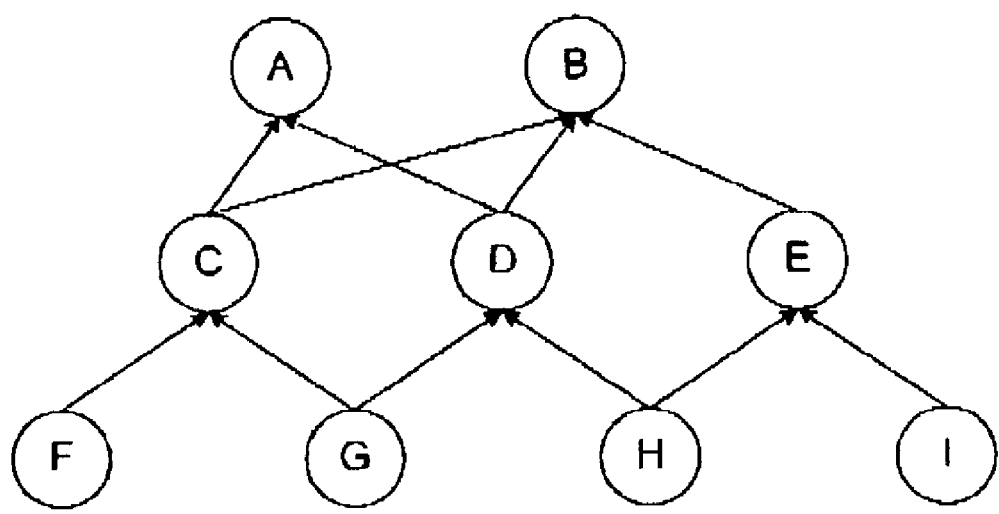
FIG. 1 shows a Directed Acyclic Graph topology representation of a multiple-inheritance hierarchy, according to prior art.
Figure 2:
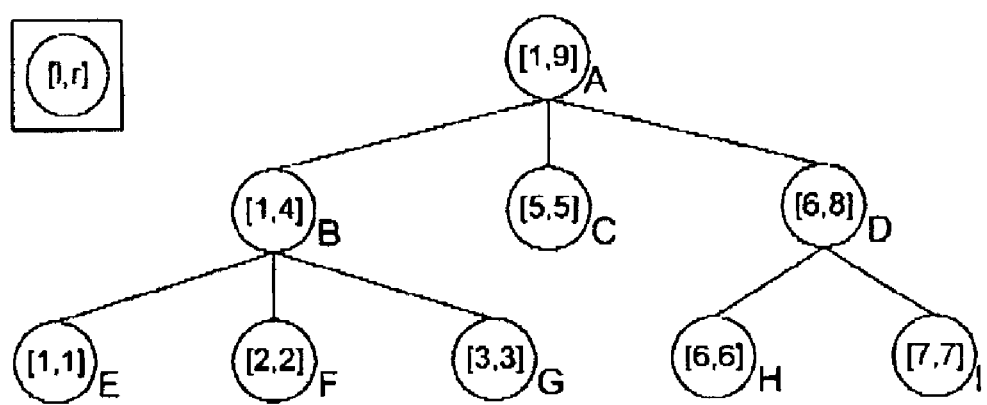
FIG. 2 illustrates a Relative Numbering encoding of a tree hierarchy, according to prior art.
Figure 3:
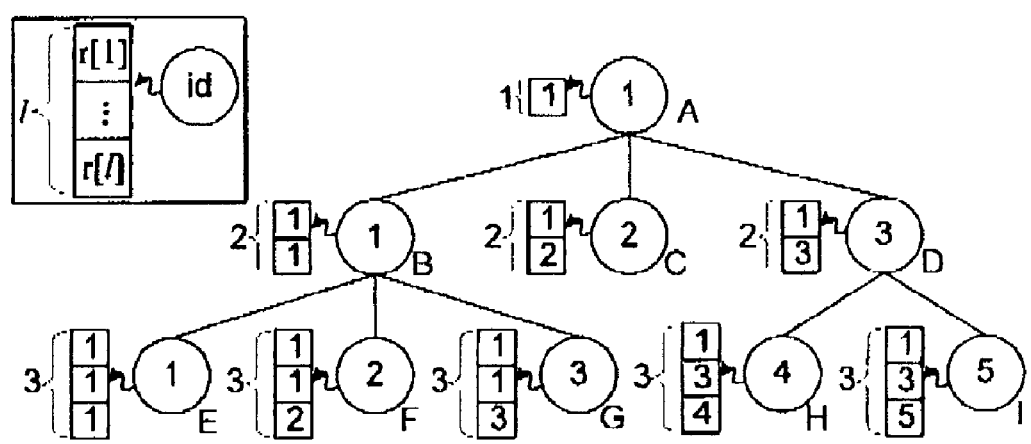
FIG. 3 illustrates a Cohen's encoding of the tree hierarchy, according to prior art.
Figure 4:
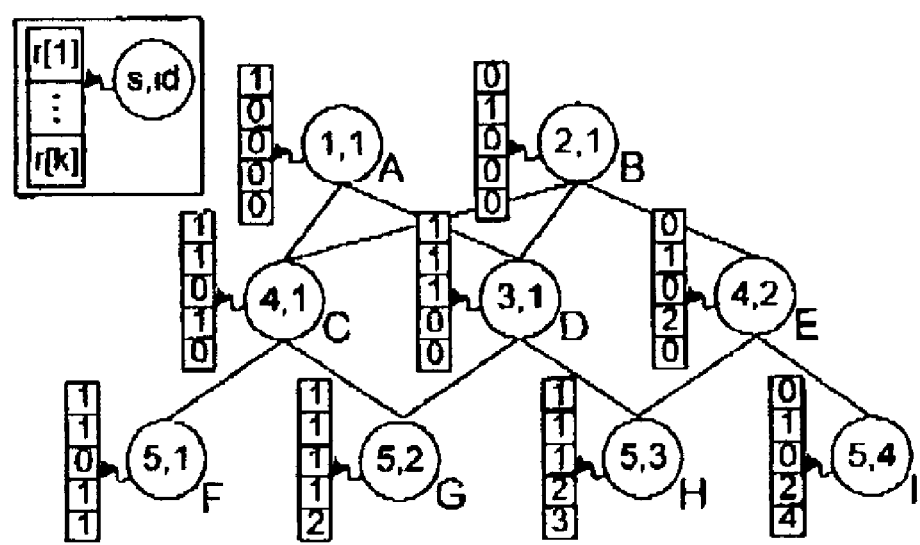
FIG. 4 illustrates a Packed encoding of the multiple-inheritance hierarchy, according to prior art.
Figure 5:
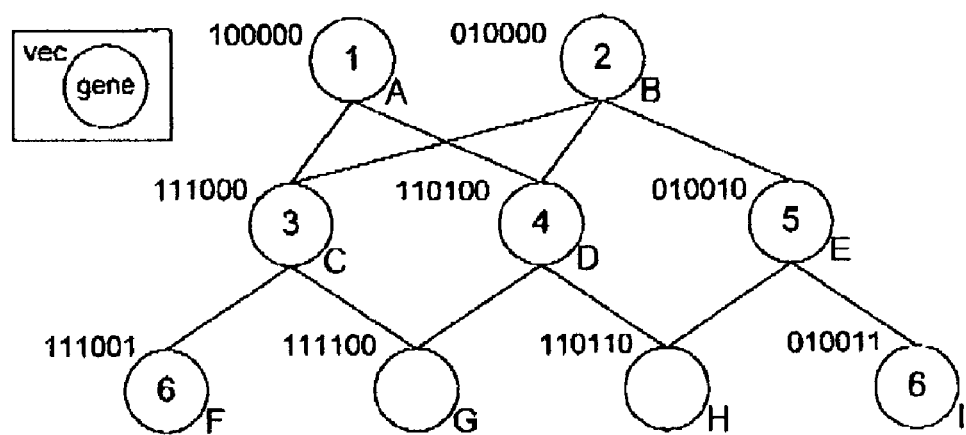
FIG. 5 illustrates a Bit-vector encoding of the multiple-inheritance hierarchy, according to prior art.
Figure 6:
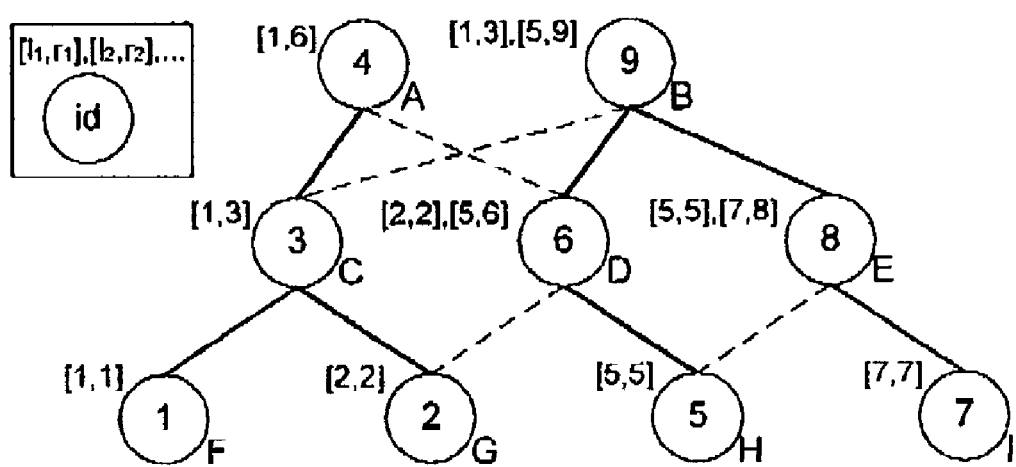
FIG. 6 illustrates a Range-compression encoding of the multiple-inheritance hierarchy, according to prior art.

The present embodiments comprise a method and apparatus for representing a dataset which can be, for example a dataset of an object-oriented computer programming language. The embodiments further comprise a data structure which represents the dataset. Specifically, the present embodiments may be used to determine a relation between two elements of the dataset. More specifically the present embodiments may be used to determine whether an element of the dataset is a subtype of another element of the dataset.

The principles and operation of a method and apparatus for representing a dataset according to the present embodiments may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

According to one aspect of the present invention there is provided an apparatus for representing a dataset having a plurality of elements, the apparatus generally referred to herein as apparatus 10.

According to a preferred embodiment of the present invention the dataset may be either a single-inheritance (SI) hierarchy dataset, or a multiple-inheritance (MI) hierarchy dataset. The elements of the dataset are preferably computer language elements, e.g., types, classes, interfaces or signatures. The elements of the dataset are characterized by relations, for example, subtype relations or supertype relations.

Figure 7:
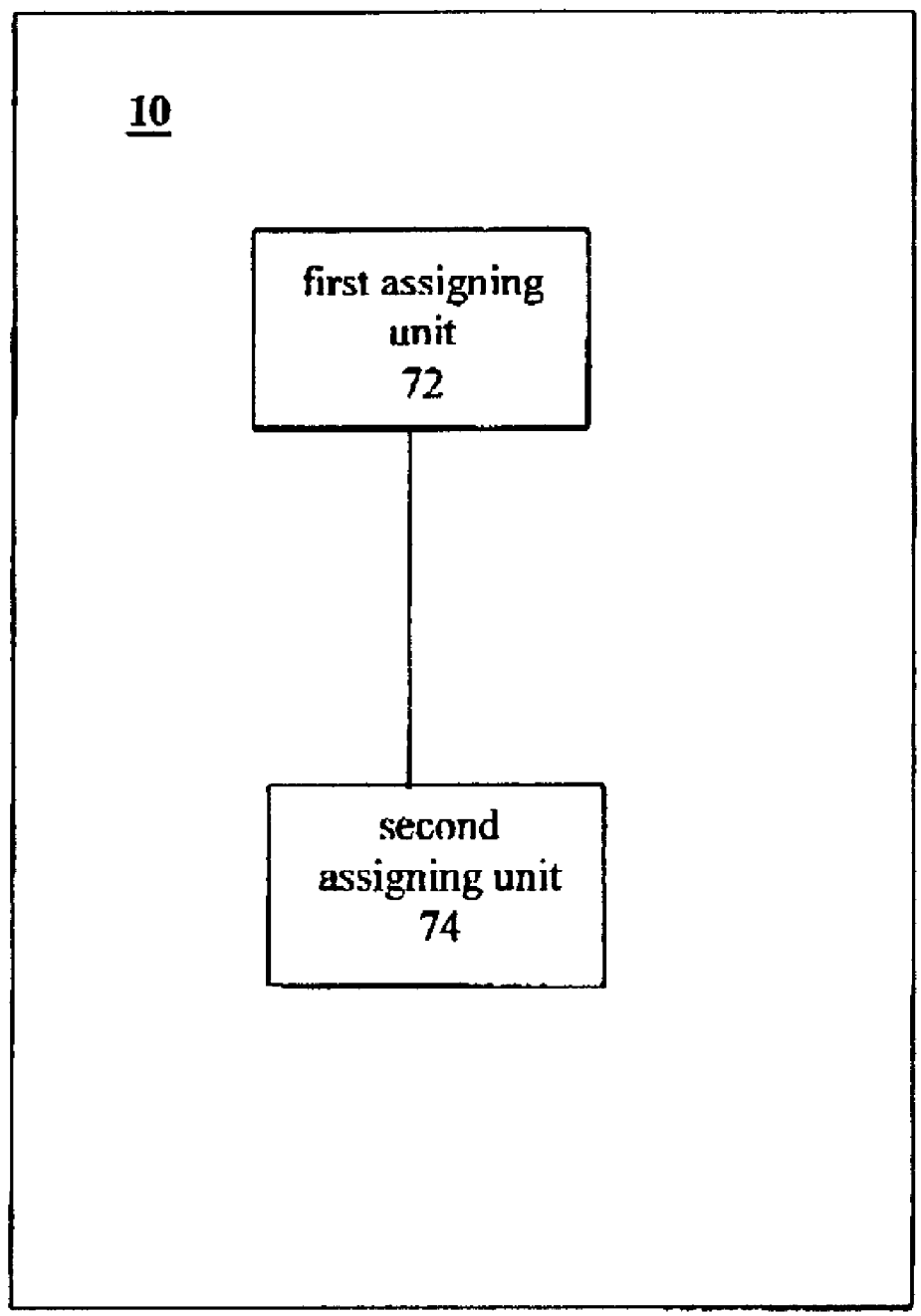
FIG. 7 is an apparatus including a first assigning unit and a second assigning unit, according to the present invention.

Referring now to the drawings, FIG. 7 illustrates apparatus 10, which includes a first assigning unit 72 and a second assigning unit 74. According to a preferred embodiment of the present invention a first assigning unit 72 serves for assigning, for each element of the dataset, an identifier. Second assigning unit 74 serves for assigning, for each element of the plurality of elements, an interval.

Figure 8:
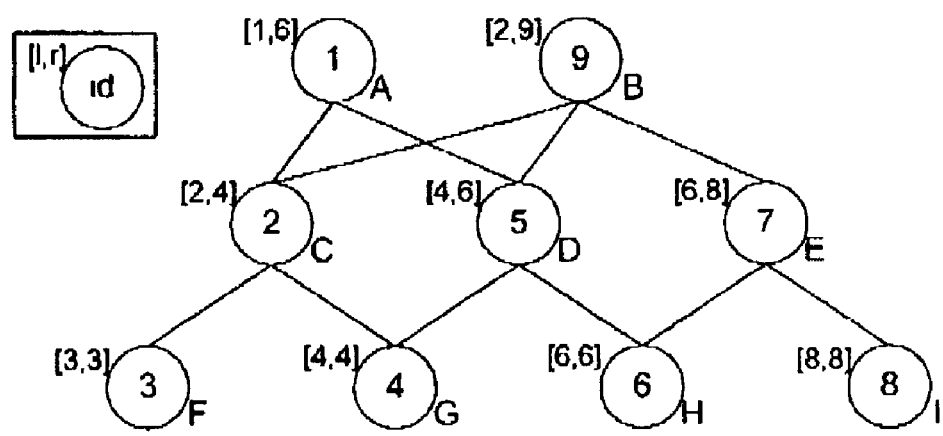
FIG. 8 shows a representation of a multiple-inheritance hierarchy, according to the present invention.

Reference is now made to FIG. 8, which illustrates diagrammatically a simplified example of a dataset having 9 elements shown as circles in FIG. 8 and denoted by the letters A, B, . . . , I. A relation between two elements is illustrated in FIG. 8 as a line, where elements drawn higher in the diagram are considered larger in the subtype relationship, e.g., $G \prec_d C$ and $H \prec A$. One ordinarily skilled in the art would appreciate that the structure of the data in FIG. 8, is of an MI hierarchy. In FIG. 8, an identifier of a specific element is shown as an integer valued number positioned within the respective circle of the specific element, and an interval is shown as a pair of integer valued numbers positioned near the respective circle of that element.

The representation of the dataset is for the purpose of determining whether an element a has a subtype relationship to another, given, element b. Let $id_a$ and $[l_a, r_a]$ be the identifier and the interval of the element a, and let $id_b$ and $[\#l_b, \#r_b]$ be the identifier and the interval of the given element b.

As used herein, the prefix symbol "#" represents a given quantity, whose value is known a-priori.

As shown in FIG. 8, each interval preferably includes the identifiers of at least one far-most descendant of its respective element. For example, element H whose identifier is 6 is one far-most descendant of element A whose identifier is 1, hence, the interval assigned to of A is [1.6].

By employing this representation on the dataset of FIG. 8, a determination whether a is subtype of b, is done by a simple check whether or not $id_a$ is within $[\#l_b, \#r_b]$. Formally, $a \prec b$ if and only if $\#l_b < id_a < \#r_b$.

Figure 9:
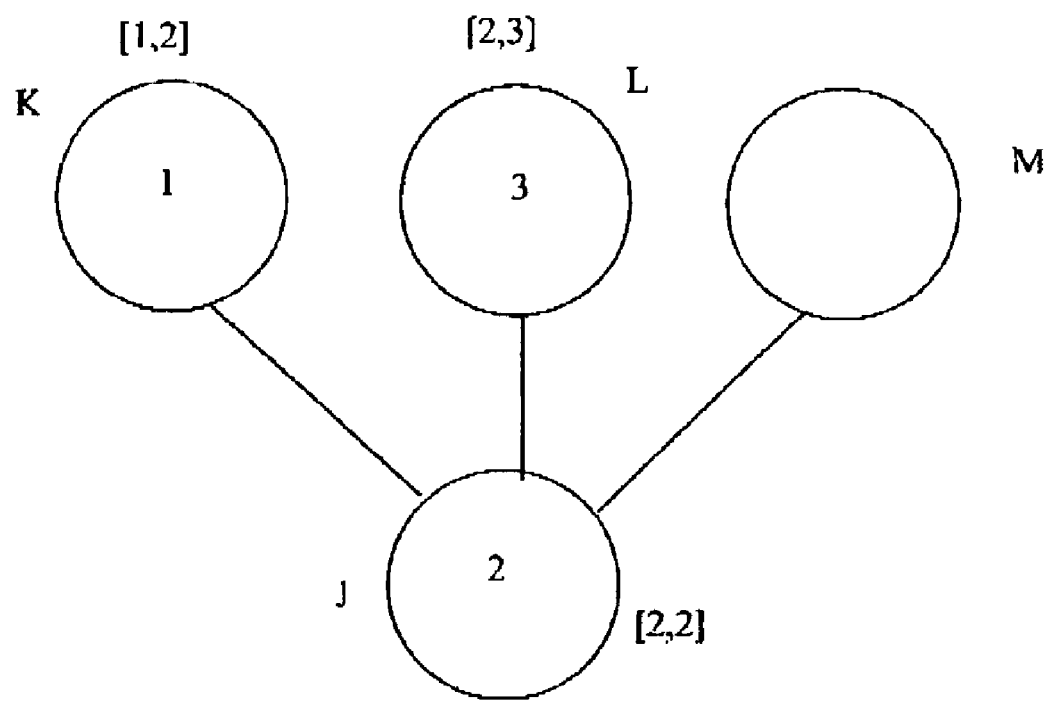
FIG. 9 is an illustration of an MI hierarchy having 4 elements in which simple representation becomes inconsistent.

Reference is now made to FIG. 9, which illustrates all MI hierarchy having 4 elements: J, K, L, M, in which the above representation becomes inconsistent. Hence, for example it is possible to use the above technique to assign identifiers to elements J, K and L but then element M is left unidentified.

The present embodiments successfully address MI datasets which are more complicated in the sense that such simple representation cannot be done. According to an additional aspect of the invention there is provided an apparatus for representing a dataset having a plurality of elements characterized by a plurality of relations. The apparatus is referred to herein as apparatus 20.

Figure 10:
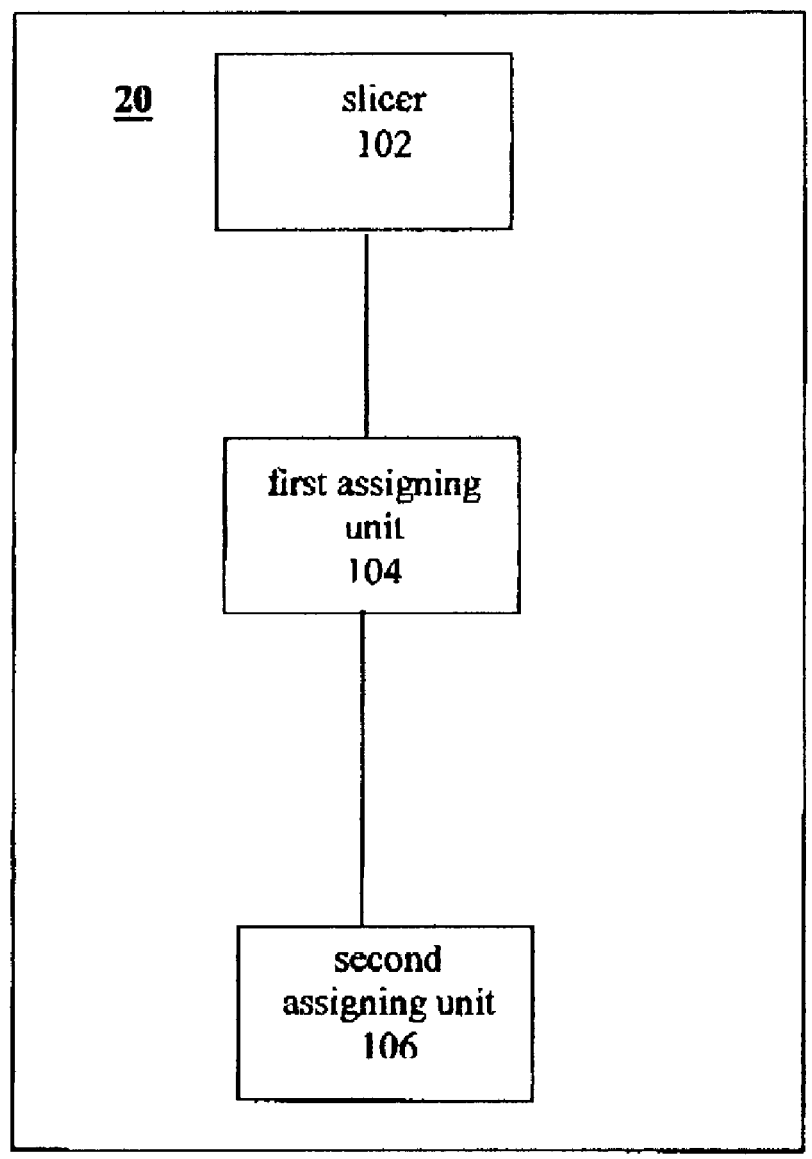
FIG. 10 is an apparatus including a slicer, a first assigning unit and a second assigning unit, according to the present invention.

Reference is now made to FIG. 10, which illustrates apparatus 20, including a slicer 102, a first assigning unit 104 and a second assigning unit 106. According to a preferred embodiment of the present invention, slicer 102 serves for slicing at least a portion of the dataset into a plurality of slices, each of the slices comprises a portion of the plurality of elements. The slicing may be done by any method known in the art, as further detailed hereinunder.

First assigning unit 104 for assigning, for each element, a set having a plurality of identifiers, where each identifier of the set is characterized by a position within the set, so that the position represents one slice. Specifically, for an element a position $s_a$ of the set identifies a within slice $s_a$.

It should be understood that since different slices come in different sizes, some of the identifiers of the set may require fewer bits than others. Typically, an identifier is stored in either a single byte or in a 16 bits word. As a result the entries of the set, which are not of equal size, cannot be referenced using ordinary computerized operations of array access. Thus, it may be said that the set is a "pseudo array".

As used herein, an access to a pseudo array is denoted by the symbol @. For example an access to position i of pseudo array r is denoted r@i.

Typically, the index i is known at compilation time of a procedure, therefore a pseudo-array access is not slower than an ordinary array access.

Second assigning unit 106 serves for assigning, for each element, an interval, which represents relations of the element to at least one element of the dataset, as detailed hereinabove.

Hence, according to a preferred embodiment of the present invention a set of identifiers $id_a$ is assigned to each element a which belongs in a slice $s_a$, and the relation $a \prec b$ may be queried by the test $\#l_b \leq id_a @ s_b \leq \#r_a$, which is a necessary and sufficient condition. Since b is known at compilation time, the above testing requires exactly the same number of RISC instructions as the Relative numbering method. Also, since the above test is similar to a boundaries check in an array access, it may be further optimized on architecture with dedicated instructions for this kind of check.

As stated, slicer 102 serves for slicing at least a portion of the dataset into a plurality of slices. Preferably, the plurality of slices has a maximal size, with respect to the property that there is a permutation, π, of all the elements of the dataset such that all descendants of any element occur consecutively in π. Thus, the slices are generated so as to provide a minimal number of slices.

According to a preferred embodiment of the present invention the slicing comprises the following steps, which may be executed by any known device or apparatus suitable for performing iterative steps. In a first step an initial element is selected to be the sole element of a first slice. The following steps, described hereinafter, are iteratively repeated preferably for all the elements in the dataset. Hence, at each iterative step an additional element is selected, this additional element is then checked whether it can be included in a specific slice (which has been defined in some previous iterative step), so as to allow simple identification of all the elements is that specific slice. If the additional element can be included in the specific slice it is added to the slice, otherwise, the check is repeated for all the other, previously defined slices. Once an additional element fails to pass all the checks with respect to all previously defined slices, a new slice is defined, and the additional element is selected to be the (temporarily) sole element of the new slice.

The check whether an element can or cannot be included within a specific slice may be any check known in the art. For example, it may be done by a Reduce operation on a PQ-tree. Reduce is a well known computer programmed procedure which is further detailed hereinunder.

A PQ-trees is data structure disclosed in [K. S. Booth and G. S. Leuker, "Testing for the consecutive ones property, interval graphs, and graph planarity using PQ-tree algorithms", *J. Comput. Sys. Sci.,* 13(3):335–379, (1976), the contents of which are hereby incorporated by reference]. Originally it was used it to test for consecutive 1's property in binary matrices of size r and in time $O(k+r+s)$ where k is the number of 1's in the matrix. The result of the PQ algorithm gave rise to the first linear time algorithm for recognizing interval graphs. Later, PQ-trees were used for other graph-theoretical problems, such as on-line planarity testing and maximum planar embeddings.

There are three kinds of a nodes in a PQ-tree: a leaf which represents a member of a given set U, a Q-node which represents the constraint that all of its children must occur in the order they occur in the tree or in reverse order, and a P-node which specifies that its children must occur together, but in any order. As a whole, a PQ-tree $\underline{P}$ represents a subset of the permutations of U, denoted by consistent($\underline{P}$). The permutation of U obtained by a traversal of $\underline{P}$, is denoted frontier(P). Two transformations of $\underline{P}$ preserve consistent($\underline{P}$), i.e., swapping any two children of a P-node, and reversing the order of the children of a Q-node. PQ-trees $\underline{P}_1$ and $\underline{P}_2$ are equivalent ($\underline{P}_1 \equiv \underline{P}_2$) if $\underline{P}_2$ can by a series of these transformations. Thus, consistent($\underline{P}$)={frontier($\underline{P}'$)|$\underline{P}' \equiv \underline{P}$}.

A universal PQ-tree, denoted, $\underline{P}^\Phi$ has a P-node as a root and a leaf for every member of U.

Let φ be a collection of subsets of a set U, i.e., $\phi \subset 2^U$, and let Π(φ) be the collection (which might be empty) of all permutations π of U such that the members of each I∈φ occur consecutively in π.

As proven by Booth and Leuker (1976), for every φ exists $\underline{P}$, and for every $\underline{P}$ exists φ such that Π(φ)=consistent(P). Reduce ($\underline{P}$,I) is a procedure which is employed in a PQ-tree algorithms. Procedure reduce($\underline{P}$,I) first checks whether there is a $\underline{P}'$, $\underline{P}' \equiv \underline{P}$ such that the elements of I appear consecutively in frontier(P'). The procedure aborts if no such P' is found. Procedure reduce then conducts a bottom up traversal of the nodes of P. At each step, one of standard eleven PQ-tree transformations is applied, until all elements of I appear consecutively in all consistent permutations. The tree $\underline{P}$ can be generated from φ by letting $\underline{P} \leftarrow \underline{P}^\Phi$; and making the procedure call reduce($\underline{P}$,I) for each I∈φ.

Hence, according to a preferred embodiment of the present invention procedure reduce is appropriate for performing the check whether or not an element can be included within a specific slice.

According to an additional aspect of the present invention, there is provided a method of representing a dataset, which is similar to the dataset described hereinabove. The method comprises the following steps, which may executed by any device or apparatus known in the art, e.g., apparatus 20. Hence, a first step of the method includes slicing at least a portion of the dataset into a plurality of slices. A second step of the present embodiment includes assigning a set of identifiers for each element of the plurality of elements, as further detailed herein above. According to the presently preferred embodiment of the invention, a third step includes assigning an interval for each element, again, as detailed above.

The present invention also provides various modifications to the above aspects targeting at improving various complexity measures of the performances of apparatus 20.

A first such optimization aims to reduce the encoding length. According to a preferred embodiment of the present invention a total number of identifiers for at least one slice may be minimized. Broadly speaking, the minimization may be done by partitioning each slice so as to provide a plurality of segments, and setting all identifiers within each segment to be equal.

Specifically, let D={b|∃a∈S(b≺a)} be the set of descendants of a slice S. Then, for some of the smaller slices the size of D, |D|, is close to n. The length optimization relies on the observation that in these cases it is possible to reuse id's while numbering the elements in D. The critical point to note is that two elements $b_1, b_2 \in D$ need to be assigned distinct identifiers only if there is a type, a∈D such that $b_1$ is a descendant of a, while $b_1$ is not a descendant of a (or vice versa). In other words, S partitions T into equivalence classes, as further exemplified hereinunder with reference to FIG. 11. It should be understood, however, that $E_0 = T \setminus D$ is a single equivalence class, which can be assigned the special id 0, which is not contained in any interval.

Thus, according to the presently preferred embodiment of the invention, for every a∈S there is an interval $I_a$ which consists of descendants of a. These |S| intervals partition the elements in D into at most 2|S|−1 segments such that all elements in the same segment can receive a same id.

Figure 11:
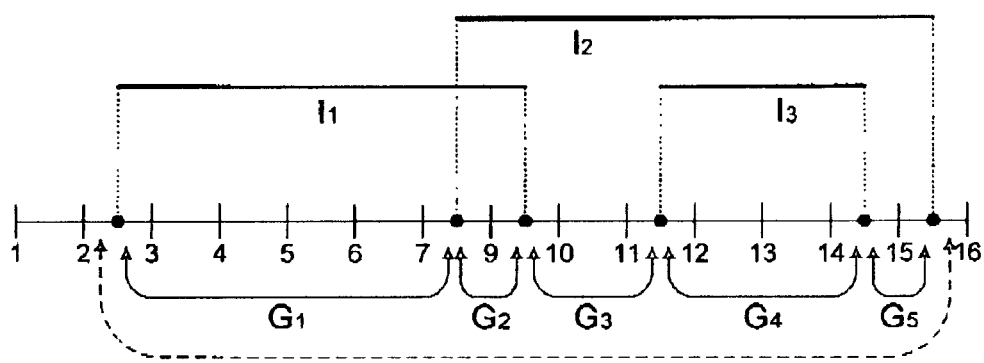
FIG. 11 is an illustration of the process of minimizing a number of identifiers, according to the present invention.

Reference is now made to FIG. 11 in which the elements in D were initially numbered 3, . . . , 15. Intervals $I_1$, $I_2$ and $I_3$ drawn in the figure partition D into 5=2·3−1 segments. This is the maximal possible number of segments, since every type in D must belong to at least one interval.

As shown in FIG. 11, every equivalence class, except $E_0$, is a collection of segments, for example, $E_0$={1, 2, 16}, $E_1=G_1$, $E_2=G_2$, $E_3=G_3 \cup G_5$, and $E_4=G_4$.

It has been realized by the inventors that in many hierarchies all slices, except the first, are of size 128 or less. Thus, the identifiers can be represented as a byte array, with each slice adding a single byte to the encoding length. The first slice receives some special handling as is further described hereinunder.

It is possible to ensure that all but one slice has their range bounded by 255. An application of reduce is simply revoked if the range required for numbering exceeds 255. Storing the current required numbering range of a PQ-tree, and updating it with each reduce is straightforward. One can also manage the equivalence classes of all slices incrementally in O(|≺|) total time.

While reducing the present invention to practice, it has been unexpectedly realized that the topology of inheritance hierarchy may considered as an "MI core" and subset of "bottom trees". Formally, an element is in the MI core if it has a descendant with more than one parent. Conversely, the set T is a collection of maximal subtrees discovered in a bottom-up search of the hierarchy. A skilled artisan would appreciate that encoding is simplified if the core is considered first, and the bottom trees of are added to the encoding later.

Hence, a second optimization of the present invention reduces the compilation time by pruning in a preprocessing stage all bottom-trees, and to produce their encoding by employing some lighter machinery. Any machinery may be used to produce the encoding of the bottom-trees, for example, the Relative numbering method as detailed herein in the Background section.

Figure 12:
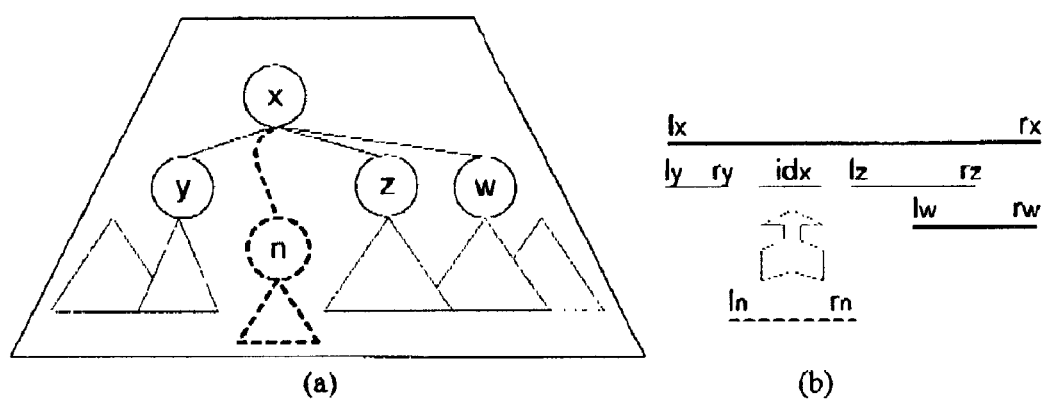
FIG. 12 is an illustration of the process of producing bottom-trees encoding, according to the present invention.

Reference is now made to FIG. 12, which is an illustration of the process of producing bottom-trees encoding, according to a preferred embodiment of the present invention. Hence, once the encoding of the core is generated, Relative numbering of each bottom-tree is inserted into the interval of its root, after an appropriate expansion of this interval.

According to a preferred embodiment of the present invention, a third optimization relates to improvement of the encoding-length. Each slice is represented in a computer memory by 8-bits. Thus, small slices having less than 8 elements use larger amount of memory than needed. Since b is known at compilation time, the compiler may choose a different code, more appropriate for small slices, to plant at a specific subtyping test.

Hence, according to the presently preferred embodiment of the invention, in cases in which b belongs to a slice having less than 8 elements, a query whether or not element a is a subtype of b implemented using BM-encoding. Since in the BM-encoding, each element adds exactly one bit to the encoding of all other elements, this modification gives significant improvement to the encoding length.

It should be appreciated that in a typical application of a subtyping test, the query element is not known, but it is rather needed to be computed from a certain object to which it is associated. Conventional object models, store for each object, a pointer $p_a$ to a memory block with run time representation of the element which is associated with a respective object. The present invention successfully provides an efficient solution for a computation of the query element from the respective object.

Hence, according to a preferred embodiment of the present invention, the identifiers of all the elements are represented with respect to the first slice. In other words, the first entry in the pseudo array $id_a$ is encoded as $p_a$. In practice this is done by defining an array having a plurality of cells, each cell comprises one interval and one set of identifiers, wherein a position of each cell corresponds to one element.

As the cells of the array are positioned in accordance with the pointers, the information of the pointer is intrinsically stored and the first identifier, e.g., id@1 of each cell of the array may be eliminated, without loosing information. One skilled in the art would appreciate that the size saving is significant, since the first slice typically occupies the largest number of bits.

In addition this also saves one load instruction in the case that b is present in the first slice. Typically, the first slice constitutes about 90% of the elements. Thus, this saving leads to a noticeable saving in the average test time.

Once the first identifier has been eliminated from each cell, further reduction in the encoding length may be achieved by coalescing identical identifiers sets. Let $id'_a$ note the set of identifiers after truncating its first entry, and let $p'_a$ be a pointer to $id'_a$. If several id' sets belonging to different elements are identical, they can be stored only once. All the distinct id's are stored in one large array denoted Z. If the number of different id sets is small, then $p'_a$ can be replaced by the index of $id'_a$ in the large array Z.

Figure 13:
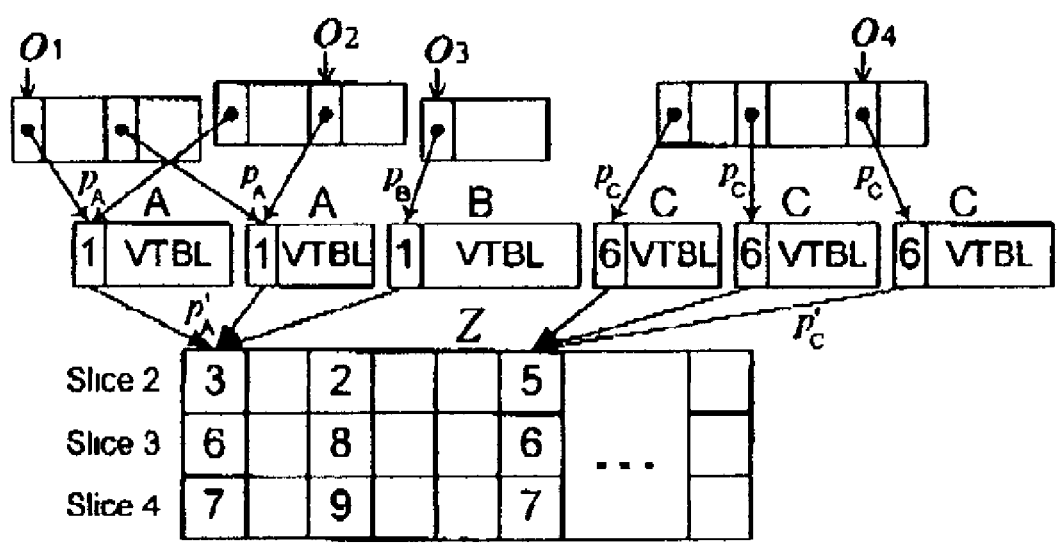
FIG. 13 is an illustrates an example of object layout model of C++ after a first truncation, according to the present invention.

Reference is now made to FIG. 13, which illustrates an example of the memory layout after the truncation, in accordance with the object layout model of C++.

In FIG. 13 pointers are shown as arrows from objects $o_i$ (i≈1,2,3,4) to dispatching tables VTBL, of classes A, B and C. Each of objects $o_1$ and $o_2$ has two pointers to the two VTBLs of class A. Each of these VTBLs stores a pointer $p'_A$ which points to a set of identifiers. Since the total number of different sets is small, instead of storing a pointer to a specific set the VTBLs store the index of the identifier in the larger array Z.

Object $o_3$ has a single pointer to the VTBL of class B. The sets of identifiers of A and B are identical, and hence the VTBLs of both elements store a reference to the same entry of array Z. Object $o_4$ has three pointers to VTBL of class C. The VTBL of C stores the index of the respective identifiers set in Z.

Figure 14:
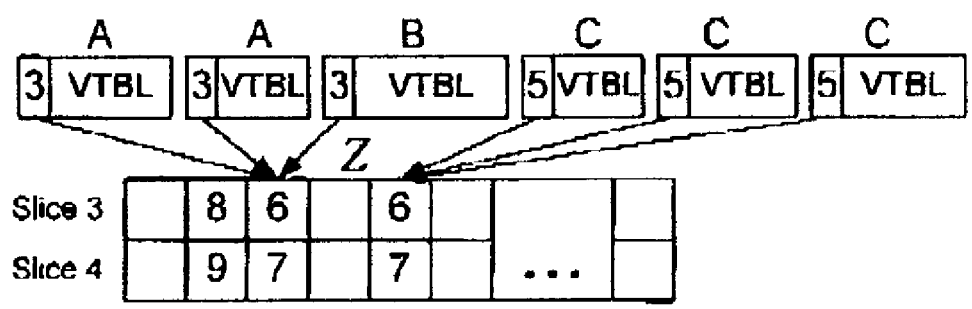
FIG. 14 is an illustrates an example of object layout model of C++ after a first truncation, according to the present invention.

Reference is now made to FIG. 14, which illustrates an example of the memory layout after an additional step of truncating the set id'.

Hence, in the same fashion that $p_a$ is used instead of $id_a@1$ for the first slice, $p'_a$ may be used instead of $id_a@2$ for the second slice. The second replacement is possible since there is a degree of freedom in the order in which the sets id' are stored in Z. In the test a≺b, if it is found that b belongs in slice $S_2$, then instead of using $id_a@2$ the compiler emits code for comparing $p_a$ with the values $l_b$ and $r_b$ which are, as usual, specialized into the test code. The entries in array Z are then the arrays id" produced by truncating the first two entries of array id.

The various embodiments of the invention described above, may be employed in any combination so as to provide an appropriate representation of the dataset. In any case, it would be appreciate that once one ore more of the embodiments described above have been employed a unique and efficient data structure is obtained. Hence, according to additional aspects of the invention there are provided the following data structures.

A first data structure, comprising a plurality of elements, where each element being represented by an identifier and an interval. The interval represents relations of a respective element to at least one element of the data structure.

A second data structure comprising a plurality of slices each slice having a plurality of elements and each element being represented by a set of identifiers and an interval. According to a preferred embodiment of the present invention the interval represents relations of a respective element to at least one element of the data structure, and each identifier is characterized by a position within the set, which position representing one of the slices.

It is appreciated that certain features of the invention, which are, for clarity, described in the context of separate embodiments, may also be provided in combination in a single embodiment. Conversely, various features of the invention, which are, for brevity, described in the context of a single embodiment, may also he provided separately or in any suitable subcombination.

Additional objects, advantages, and novel features of the present invention will become apparent to one ordinarily skilled in the art upon examination of the following example, which are not intended to be limiting. Additionally, each of the various embodiments and aspects of the present invention as delineated hereinabove and as claimed in the claims section below finds experimental support in the following example.

EXAMPLE

Reference is now made to the following example, which together with the above descriptions, illustrate the invention in a non limiting fashion.

Data Set

Multiple inheritance hierarchies were taken from [N. Eckel and J. Y. Gil, "Empirical study of object-layout strategies and optimization techniques", *Proceedings of the 14th European Conference on Object-Oriented programming,* Sophia Antipolis and Cannes, France, editor, E. Bertino, number 1850 in Lecture Notes in Computer Science, 394–421 (2000)]. This data set represents 9 large hierarchies of types drawn from various object-oriented languages. In addition, three new JAVA hierarchies were included.

Statistical information on the data sets is presented in Table 1. The number of types ranges between 66 and 5,438. In total the 12 hierarchies represent over 18,500 types.

TABLE 1

| Hierarchy | n | $<_d]/n$ | $<[/n$ | $\alpha^a$ | height | $\lceil \log n \rceil$ | $|T'|/n$ |
|---|---|---|---|---|---|---|---|
| IDL | 66 | 0.98 | 3.83 | 8 | 6 | 7 | 15% |
| Laure | 295 | 1.07 | 8.13 | 16 | 11 | 9 | 18% |
| Unidraw | 613 | 0.78 | 3.02 | 9 | 8 | 10 | 4% |
| JDK 1.1 | 225 | 1.04 | 3.17 | 7 | 6 | 8 | 5% |
| Self | 1801 | 1.02 | 29.89 | 40 | 16 | 11 | 9% |
| Ed | 434 | 1.66 | 7.99 | 23 | 10 | 9 | 61% |
| Lov | 436 | 1.71 | 8.50 | 24 | 9 | 9 | 62% |
| Eiffel4 | 1999 | 1.28 | 8.78 | 39 | 17 | 11 | 46% |
| Geode | 1318 | 1.89 | 13.99 | 50 | 13 | 11 | 75% |
| JDK 1.18 | 1704 | 1.10 | 4.35 | 16 | 9 | 11 | 18% |
| JDK 1.22 | 4339 | 1.19 | 4.37 | 17 | 9 | 13 | 22% |
| JDK 1.30 | 5438 | 1.17 | 4.37 | 19 | 9 | 13 | 21% |

As can be seen from Table 1, the average number of parents, $|<_d|/n$, is less than 2, while the average number of ancestors, $|<|/n$, is large. For example, in the Self hierarchy (row 5 in Table 1) a type has in average almost 30 ancestors. The maximal number of ancestors plays an important factor in the complexity of some of the algorithms. Also of interest is the Geode hierarchy, where there exists a type which has 50 ancestors in total. By comparing the height of the hierarchy with log n a skilled artisan would see that the hierarchies are shallow; their height is similar to that of a balanced binary tree.

The rightmost column of Table 1 shows the relative size of the MI core, T', of the dataset.

Internal Parameters

Table 2 presents values of some internal parameters in the execution of PQE and CPQE. The total number of distinct slices is k. The number of types in the first slice is denoted by $n_1$, while $n_2$ is the number of types in slices whose size is smaller than 8. The value k'<k is the number of slices not which do not fall in these two categories.

TABLE 2

| Hierarchy | k | $n_1/n$ | $n_2/n$ | $n_2$ | m | k' |
|---|---|---|---|---|---|---|
| IDL | 1 | 100% | 0% | 0 | 0 | 0 |
| Laure | 2 | 98% | 2% | 6 | 7 | 0 |
| Unidraw | 2 | 99.7% | 0.3% | 2 | 2 | 0 |
| JDK 1.1 | 2 | 99.6% | 0.4% | 1 | 1 | 0 |
| Self | 13 | 97.2% | 1.7% | 31 | 63 | 1 |
| Ed | 10 | 87.8% | 4.6% | 20 | 145 | 2 |
| LOV | 12 | 86.2% | 6% | 26 | 164 | 2 |
| Effel4 | 11 | 89.1% | 0.5% | 9 | 376 | 7 |
| Geode | 16 | 86% | 1.8% | 24 | 419 | 7 |
| JDK 1.18 | 8 | 97.5% | 0.5% | 9 | 74 | 2 |
| JDK 1.22 | 8 | 97.6% | 0.3% | 12 | 235 | 3 |
| JDK 1.30 | 8 | 97.7% | 0.3% | 17 | 286 | 3 |

Encoding Creation Time

Encoding creation time of the method of the present invention with coalescing (CPQE) and without coalescing (PQE) was measured and compared with the encoding creation time of NHE, BPE and PE.

The creation time of PQF was found to be equal to the encoding creation time of CPQE, and the encoding creation time of PE was found to be equal to the encoding creation time of BPE.

The results are shown in Table 3. The algorithms were run on different machines. The method of the present invention was written in C++ based on a PQ-tree implementation taken from [S. Leipert, "PQ-trees, an implementation as template class in C++", *Technical report, Informatik,* Universität zu Köln, 1997]. PQE, which is based on a linear algorithm, outperforms the quadratic NHE-algorithm. PE and BPE, which use a fast implementation of set unions and intersections using bit-vector operations, seem to be the fastest. The Geode hierarchy is toughest for all algorithms. In this hierarchy the average time for processing a type is less than one millisecond in CPQE. In all benchmarks the time for computing the encoding is less than a second.

TABLE 3

| Hierarchy | (C)PQE[a] | NHE[b] | (B)PE[b] |
|---|---|---|---|
| IDL | 1 | — | — |
| Laure | 4 | 21 | 2 |
| Unidraw | 1 | 93 | 3 |
| JDK 1.1 | 1 | 19 | 1 |
| Self | 122 | 1367 | 11 |
| Ed | 77 | 136 | 4 |
| LOV | 95 | 168 | 4 |
| Eiffel4 | 299 | — | — |
| Geode | 668 | 1902 | 13 |
| JDK 1.18 | 29 | — | — |
| JDK 1.22 | 140 | — | — |
| JDK 1.30 | 187 | — | — |

[a]266 Mhz Pentium III
[b]500 Mhz 21164 Alpha

Encoding Length

Table 4 compares the encoding length in bits of PQE and CPQE with that of other algorithms. The PQE-algorithm is presented with all optimizations, as detailed above.

PQE encoding length improves on all previously published algorithms. As explained above, the memory requirements of PQE is zero for all SI hierarchies. As can be seen in the table, zero memory footprint occurs even in IDL, which is MI. The median improvement with the next best algorithm, NHE, is by 36%, while the average improvement is 49%.

In addition, PQE test time is constant, whereas NHE, which is based on bit-vector encoding is nonconstant.

TABLE 4

| Hierarchy | CPQE | PQE | NHE | BPF | PF | DAG[a] | Closure[b] | BM |
|---|---|---|---|---|---|---|---|---|
| IDL | 8 | 0 | 17 | 32 | 96 | 7 | 27 | 66 |
| Laure | 8 | 6 | 23 | 63 | 128 | 0 | 74 | 295 |
| Unidraw | 8 | 2 | 30 | 63 | 96 | 8 | 31 | 613 |
| JDK 1.1 | 8 | 1 | 19 | 32 | 64 | 9 | 26 | 225 |
| Self | 9 | 39 | 53 | 126 | 344 | 12 | 329 | 1801 |
| bd | 17 | 36 | 54 | 94 | 216 | 15 | 72 | 434 |
| LOV | 21 | 42 | 57 | 157 | 216 | 16 | 77 | 436 |
| Eiffel4 | 27 | 65 | 72 | 157 | 312 | 15 | 97 | 1999 |
| Geode | 39 | 80 | 95 | — | 408 | 21 | 154 | 1318 |
| JDK 1.11 | 9 | 25 | 39 | — | — | 13 | 48 | 1704 |
| JDK 1.22 | 19 | 36 | 62 | — | — | 16 | 57 | 4339 |
| JDK 1.30 | 18 | 41 | 65 | — | — | 16 | 57 | 5438 |

[a] $(|<_d|\lceil \log n \rceil)/n$
[b] $(|<|\lceil \log n \rceil)/n$

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computer implemented method of representing a dataset having a plurality of elements characterized by a plurality of relations, the method comprising:
   (a) slicing at least a portion of the dataset into a plurality of slices, each of said slices comprises a portion of said plurality of elements, said slicing comprising, for each slice;
      (i) selecting an initial element for said slice,
      (ii) selecting an additional element, traversing a PQ-tree so to determine whether said additional element is to be included within said slice, and if so than including said additional element within said slice, and
      (iii) repeating said step (ii) at least once;
   (b) for each element of the plurality of elements, assigning a set of identifiers, each identifier of said set being characterized by a position within said set, said position representing one of said slices; and
   (c) for each element of the plurality of elements, assigning an interval, said interval representing at least one relation of said element to at least one element of the plurality of elements.

2. The method of claim 1, wherein the dataset is a single-inheritance hierarchy dataset.

3. The method of claim 1, wherein the dataset is a multiple-inheritance hierarchy dataset.

4. The method of claim 1, wherein the elements are computer language elements.

5. The method of claim 4, wherein said computer language elements are selected from the group consisting of types, classes, interfaces and signatures.

6. The method of claim 1, wherein the relations are selected from the group consisting of subtype relations, and supertype relations.

7. The method of claim 1, wherein each of said identifiers is a number having an integer value.

8. The method of claim 1, wherein said interval of said element is defined by at least two identifiers of at least two respective elements.

9. The method of claim 1, wherein said element and said at least two respective elements, form a portion of one of said slices.

10. The method of claim 8, wherein the relations are selected from the group consisting of subtype relations, and supertype relations.

11. The method of claim 10, wherein each of said at least two respective elements has a subtype relation to said element, hence each of said at least two respective elements is a descendant of said element.

12. The method of claim 11, wherein at least one descendant is a far-most descendant, within one of said slices.

13. The method of claim 1, wherein each of said plurality of slices has a maximal size.

14. The method of claim 1, wherein said slicing is done so as to provide a minimal number of slices.

15. The method of claim 1, wherein said traversing is by a procedure selected from the group consisting of a reduce operation and a depth-first-search on said PQ-tree.

16. The method of claim 1, further comprising minimizing a total number of identifiers for at least one slice of said slices.

17. The method of claim 16, wherein said minimizing is by partitioning said at least one slice so as to provide a plurality of segments, and setting all identifiers within each of said segments to be equal.

18. The method of claim 17, wherein said partitioning is by determining overlaps between respective intervals of at least two of said elements.

19. The method of claim 1, further comprising determining a core for the dataset prior to said step of slicing, said core being a multiple-inheritance hierarchy core.

20. The method of claim 19, wherein said portion of the dataset comprises said core.

21. The method of claim 1, further comprising representing at least a portion of said plurality of slices using a binary matrix.

22. The method of claim 1, further comprising defining an array having a plurality of cells, each cell comprises one interval and one set of identifiers, wherein a position of each cell corresponds to one element of said plurality of elements.

23. The method of claim 22, further comprising, for each cell, eliminating a first identifier from a respective set of identifiers.

24. The method of claim 23, further comprising coalescing identical sets of identifiers.

25. An apparatus for representing a dataset having a plurality of elements characterized by a plurality of relations, the apparatus comprising:
   (a) a slicer for slicing at least a portion of the dataset into a plurality of slices, each of said slices comprising a portion of said plurality of elements, said slicer comprising;
      (i) an initiator for selecting an initial element for one of said plurality of slices;
      (ii) a selector for selecting an additional element;

(iii) a determinator having means for traversing a PQ-tree so as to determine whether said additional element is to be included within one of said slices; and (iv) a memory for storing said additional element;

(b) a first assigning unit for assigning, for each element, a set having a plurality of identifiers, each identifier of said set being characterized by a position within said set, said position representing one of said slices; and (c) a second assigning unit for assigning, for each element, an interval, said interval representing relations of the element to at least one element of the dataset.

26. The apparatus of claim 25, wherein the dataset is a single-inheritance hierarchy dataset.

27. The apparatus of claim 25, wherein the dataset is a multiple-inheritance hierarchy dataset.

28. The apparatus of claim 25, wherein the elements are computer language elements.

29. The apparatus of claim 28, wherein said computer language elements are selected from the group consisting of types, classes, interfaces and signatures.

30. The apparatus of claim 25, wherein the relations are selected from the group consisting of subtype relations, and supertype relations.

31. The apparatus of claim 25, wherein each of said identifiers is a number having an integer value.

32. The apparatus of claim 25, wherein said interval of said element is defined by at least two identifiers of at least two respective elements.

33. The apparatus of claim 25, wherein said element and said at least two respective elements, form a portion of one of said slices.

34. The apparatus of claim 32, wherein the relations are selected from the group consisting of subtype relations, and supertype relations.

35. The apparatus of claim 34, wherein each of said at least two respective elements has a subtype relation to said element, hence each of said at least two respective elements is a descendant of said element.

36. The apparatus of claim 35, wherein at least one descendant is a far-most descendant, within one of said slices.

37. The apparatus of claim 25, wherein each of said plurality of slices has a maximal size.

38. The apparatus of claim 25, wherein said slicer is operable to provide a minimal number of slices.

39. The apparatus of claim 25, wherein said means are capable of performing at least one procedure selected from the group consisting of a reduce operation and a depth-first-search on said PQ-tree.

40. A computer implemented method of representing a dataset having a plurality of elements characterized by a plurality of relations, the method comprising:

slicing at least a portion of the dataset into a plurality of slices, each of said slices comprises a portion of said plurality of elements;

for each element of the plurality of elements, assigning a set of identifiers, each identifier of said set being characterized by a position within said set, said position representing one of said slices;

for at least one at least one slice of said plurality of slices, partitioning said at least one slice so as to provide a plurality of segments, and setting all identifiers within each of said segments to be equal, thereby minimizing a total number of identifiers of said at least one slice; and for each element of the plurality of elements, assigning an interval, said interval representing at least one relation of said element to at least one element of the plurality of elements.

41. The method of claim 40, wherein said partitioning is by determining overlaps between respective intervals of at least two of said elements.

42. The method of claim 40, further comprising determining a core for the dataset prior to said step of slicing, said core being a multiple-inheritance hierarchy core.

43. The method of claim 42, wherein said portion of the dataset comprises said core.

44. The method of claim 40, further comprising representing at least a portion of said plurality of slices using a binary matrix.

45. The method of claim 40, further comprising defining an array having a plurality of cells, each cell comprises one interval and one set of identifiers, wherein a position of each cell corresponds to one element of said plurality of elements.

46. The method of claim 45, further comprising, for each cell, eliminating a first identifier from a respective set of identifiers.

47. The method of claim 46, further comprising coalescing identical sets of identifiers.

48. A computer implemented method of representing a dataset having a plurality of elements characterized by a plurality of relations, the method comprising:

determining a core for the dataset, said core being a multiple-inheritance hierarchy core;

slicing at least a portion of the dataset into a plurality of slices, each of said slices comprises a portion of said plurality of elements;

for each element of the plurality of elements, assigning a set of identifiers, each identifier of said set being characterized by a position within said set, said position representing one of said slices; and for each element of the plurality of elements, assigning an interval, said interval representing at least one relation of said element to at least one element of the plurality of elements.

49. The method of claim 48, wherein said portion of the dataset comprises said core.

50. The method of claim 48, further comprising defining an array having a plurality of cells, each cell comprises one interval and one set of identifiers, wherein a position of each cell corresponds to one element of said plurality of elements.

51. The method of claim 50, further comprising, for each cell, eliminating a first identifier from a respective set of identifiers.

52. The method of claim 51, further comprising coalescing identical sets of identifiers.

53. The method of claim 48, wherein the elements are computer language elements.

54. The method of claim 53, wherein said computer language elements are selected from the group consisting of types, classes, interfaces and signatures.

55. The method of claim 48, wherein the relations are selected from the group consisting of subtype relations, and supertype relations.

56. The method of claim 48, wherein each of said identifiers is a number having an integer value.

57. The method of claim 48, wherein said interval of said element is defined by at least two identifiers of at least two respective elements.

58. The method of claim 48, wherein said element and said at least two respective elements, form a portion of one of said slices.

59. The method of claim 57, wherein the relations are selected from the group consisting of subtype relations, and supertype relations.

60. The method of claim 59, wherein each of said at least two respective elements has a subtype relation to said element, hence each of said at least two respective elements is a descendant of said element.

61. The method of claim 60, wherein at least one descendant is a far-most descendant, within one of said slices.

62. The method of claim 48, wherein, each of said plurality of slices has a maximal size.

63. The method of claim 48, wherein said slicing is done so as to provide a minimal number of slices.

64. The method of claim 48, wherein said slicing comprises steps of:
   for each slice:
   (i) selecting an initial element for said slice;
   (ii) selecting an additional element and determining whether said additional element is to be included within said slice, and if so than including said additional element within said slice; and
   (iii) repeating said step (ii) at least once.

65. The method of claim 64, wherein said determining whether said additional element is to be included within said slice, is by a depth-first-search traversal on a PQ-tree.

66. The method of claim 48, further comprising minimizing a total number of identifiers for at least one slice of said slices.

67. The method of claim 66, wherein said minimizing is by partitioning said at least one slice so as to provide a plurality of segments, and setting all identifiers within each of said segments to be equal.

68. The method of claim 67, wherein said partitioning is by determining overlaps between respective intervals of at least two of said elements.

69. The method of claim 48, further comprising representing at least a portion of said plurality of slices using a binary matrix.

70. The method of claim 48, further comprising defining an array having a plurality of cells, each cell comprises one interval and one set of identifiers, wherein a position of each cell corresponds to one element of said plurality of elements.

71. The method of claim 70, further comprising, for each cell, eliminating a first identifier from a respective set of identifiers.

72. The method of claim 71, further comprising coalescing identical sets of identifiers.

73. A computer implemented method of representing a dataset having a plurality of elements characterized by a plurality of relations, the method comprising:
   slicing at least a portion of the dataset into a plurality of slices, each of said slices comprises a portion of said plurality of elements;
   for each element of the plurality of elements, assigning a set of identifiers, each identifier of said set being characterized by a position within said set, said position representing one of said slices;
   for each element of the plurality of elements, assigning an interval, said interval representing at least one relation of said element to at least one element of the plurality of elements;
   defining an array having a plurality of cells, each cell comprising one interval and one set of identifiers, wherein a position of each cell corresponds to one element of said plurality of elements; and
   for each cell of said plurality of cells, eliminating a first identifier from a respective set of identifiers.

74. The method of claim 73, further comprising coalescing identical sets of identifiers.

75. The method of claim 73, wherein the dataset is a single-inheritance hierarchy dataset.

76. The method of claim 73, wherein the dataset is a multiple-inheritance hierarchy dataset.

77. The method of claim 73, wherein the elements are computer language elements.

78. The method of claim 77, wherein said computer language elements are selected from the group consisting of types, classes, interfaces and signatures.

79. The method of claim 73, wherein the relations are selected from the group consisting of subtype relations, and supertype relations.

80. The method of claim 73, wherein each of said identifiers is a number having an integer value.

81. The method of claim 73, wherein said interval of said element is defined by at least two identifiers of at least two respective elements.

82. The method of claim 73, wherein said element and said at least two respective elements, form a portion of one of said slices.

83. The method of claim 81, wherein the relations are selected from the group consisting of subtype relations, and supertype relations.

84. The method of claim 83, wherein each of said at least two respective elements has a subtype relation to said element, hence each of said at least two respective elements is a descendant of said element.

85. The method of claim 84, wherein at least one descendant is a far-most descendant, within one of said slices.

86. The method of claim 73, wherein each of said plurality of slices has a maximal size.

87. The method of claim 73, wherein said slicing is done so as to provide a minimal number of slices.

88. The method of claim 73, wherein said slicing comprises steps of:
   for each slice:
   (i) selecting an initial element for said slice;
   (ii) selecting an additional element and determining whether said additional element is to be included within said slice, and if so than including said additional element within said slice; and
   (iii) repeating said step (ii) at least once.

89. The method of claim 88, wherein said determining whether said additional element is to be included within said slice, is by a depth-first-search traversal on a PQ-tree.

90. The method of claim 73, further comprising minimizing a total number of identifiers for at least one slice of said slices.

91. The method of claim 90, wherein said minimizing is by partitioning said at least one slice so as to provide a plurality of segments, and setting all identifiers within each of said segments to be equal.

92. The method of claim 91, wherein said partitioning is by determining overlaps between respective intervals of at least two of said elements.

93. The method of claim 73, further comprising determining a core for the dataset prior to said step of slicing, said core being a multiple-inheritance hierarchy core.

94. The method of claim 93, wherein said portion of the dataset comprises said core.

95. The method of claim 73, further comprising representing at least a portion of said plurality of slices using a binary matrix.

* * * * *